United States Patent [19]
Geiwiz et al.

[11] Patent Number: 6,140,478
[45] Date of Patent: Oct. 31, 2000

[54] BASIC AZO COMPOUNDS, THEIR PRODUCTION AND USE

[75] Inventors: Jürgen Geiwiz, Lörrach-Hauingen, Germany; Helmut Anton Moser, Oberwil; Reinhard Pedrazzi, Allschwil, both of Switzerland

[73] Assignee: Clariant Finance (BVI) Limited, Tortola

[21] Appl. No.: 08/683,938

[22] Filed: Jul. 19, 1996

[30] Foreign Application Priority Data

Jul. 21, 1995 [DE] Germany ............ 195 26 652

[51] Int. Cl.$^7$ ............ C09B 31/153; C09B 33/12; C09B 35/031; D06P 3/32; D06P 3/60
[52] U.S. Cl. ............ 534/759; 8/437; 8/919; 162/162; 534/606; 534/772
[58] Field of Search ............ 534/759, 772, 534/606; 162/162; 8/919, 437

[56] References Cited

U.S. PATENT DOCUMENTS

| | | | |
|---|---|---|---|
| 3,957,747 | 5/1976 | Austin et al. | 534/772 |
| 3,994,906 | 11/1976 | Hegar | 534/606 X |
| 4,079,052 | 3/1978 | Muller | 534/759 X |
| 4,224,025 | 9/1980 | Bühler | 534/636 |
| 4,673,735 | 6/1987 | Moser et al. | 534/606 |
| 4,742,161 | 5/1988 | Dorë | 534/606 |
| 4,780,106 | 10/1988 | Moser et al. | 534/606 X |
| 5,015,292 | 5/1991 | Bruder et al. | 534/606 X |
| 5,059,683 | 10/1991 | Moser et al. | 534/759 |
| 5,352,334 | 10/1994 | Moser et al. | 534/606 X |

FOREIGN PATENT DOCUMENTS

| | | | |
|---|---|---|---|
| 2238795 | 8/1971 | Germany | 534/772 |
| 63-305362 | 12/1988 | Japan | 534/759 |
| 63-305363 | 12/1988 | Japan | 534/759 |
| 1285339 | 8/1972 | United Kingdom | 534/772 |
| 1296857 | 11/1972 | United Kingdom | 534/772 |
| 2166752 | 5/1986 | United Kingdom | 534/759 |

*Primary Examiner*—Floyd D. Higel
*Attorney, Agent, or Firm*—Scott E. Hanf

[57] ABSTRACT

Basic azo compounds of formula I

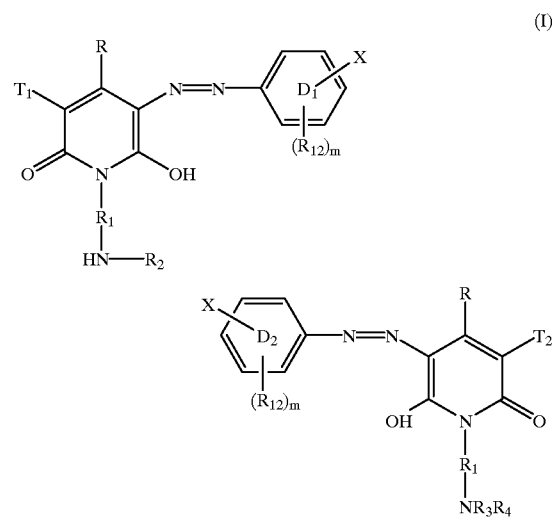

are suitable for coloring or printing especially of paper and leather.

12 Claims, No Drawings

BASIC AZO COMPOUNDS, THEIR PRODUCTION AND USE

The present invention relates to basic azo compounds, their production and use.

Basic azo compounds of the type of the present invention are for example described in DE 3 538 517, DE 3 609 590 or EP 0 092 520. These compounds differ from those of the present invention by the substituents on the pyridone ring. It has surprisingly now been found, that the compounds of the present invention have particularly good alcohol- and soapy-water fastness and excellent reductive bleaching ability.

The present invention provides the following basic azo compounds of formula I

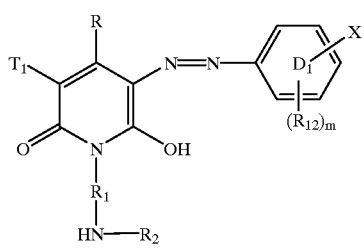

(I)

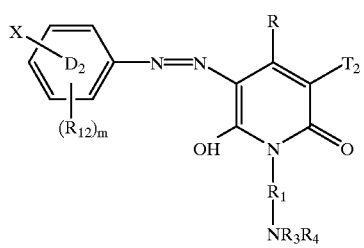

wherein
the two Rs independently of each other are H, $C_{1-4}$alkyl, $C_{5-6}$cycloalkyl, phenyl, benzyl or phenylethyl,
$T_1$ and $T_2$ independently of each other are H, —CN, —COOR$_5$, CONR$_6$R$_7$, SO$_2$NR$_6$R$_7$,

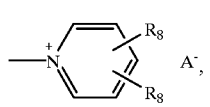 A$^-$, 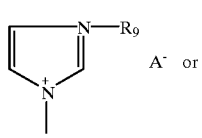 A$^-$ or

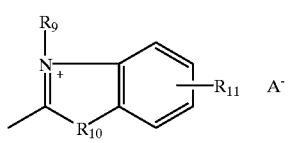 A$^-$ $R_1$ signifies $C_{1-6}$alkylene or $C_{2-6}$alkenylene,
$R_2$ and $R_3$ independently of each other are unsubstituted $C_{1-6}$alkyl, $C_{2-6}$alkyl substituted by OH, CN or halogen, phenyl-$C_{1-3}$alkyl, wherein the phenyl radical is optionally substituted from 1 to 3 times, by a substituent from the group of substituents comprising chlorine, $C_{1-4}$alkyl or $C_{1-4}$alkoxy, unsubstituted $C_{5-6}$cycloalkyl or $C_{5-6}$cycloalkyl substituted from 1 to 3 times by $C_{1-4}$alkyl groups $R_4$ signifies any of the meanings of $R_2$ or $R_3$ or hydrogen,
$R_5$ signifies a $C_{1-6}$alkyl radical or phenyl-$C_{1-3}$alkyl radical,
$R_6$ and $R_7$ independently of each other are H or a $C_{1-4}$alkyl radical,
$R_8$ independently of each other signifies H, a $C_{1-4}$alkyl radical, —NR$_6$R$_7$ or —CONR$_6$R$_7$,
$R_9$ signifies a $C_{1-4}$alkyl radical or a hydroxy-$C_{1-4}$alkyl radical,
$R_{10}$ signifies —S—, —O— or

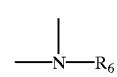

$R_{11}$ signifies hydrogen or a $C_{1-4}$alkyl radical,
the two $R_{12}$'s independently of each other, are halogen, OH, a $C_{1-4}$alkyl radical or a $C_{1-4}$alkoxy radical,
the two m's independently of each other, are 0, 1 or 2,
X signifies:
$X_1$ a direct bond;
$X_2$ a straight or branched $C_{1-4}$alkylene;
$X_3$ —NH—CS—NH—; $X_4$ —O—; $X_5$ —CH═CH—;
$X_6$ —*NH—CO—; $X_{6a}$ —NH—*CO—; $X_7$

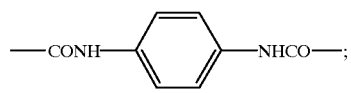

wherein the asterixed atom is bonded to ring $D_1$;
$X_8$

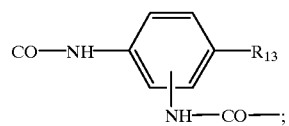

$X_9$

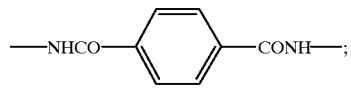

$X_{10}$

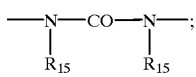

$X_{11}$

$X_{12}$ 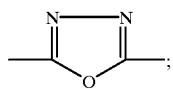

$X_{13}$ 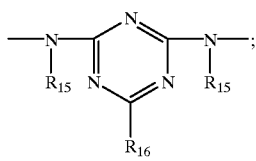

$X_{14}$ 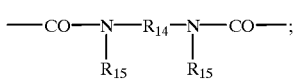

$R_{13}$ is halogen, a $C_{1-4}$alkyl radical or a $C_{1-4}$alkoxy radical, $R_{14}$ is straight or branched $C_{1-4}$-alkylene, the two $R_{15}$S independently of each other, are H or a $C_{1-4}$alkyl radical, $R_{16}$ is halogen, —NHCH$_2$CH$_2$OH, —N(CH$_2$CH$_2$OH)$_2$, NH$_2$, OH or —NH(CH$_2$)$_{2-3}$N(C$_2$H$_5$)$_2$, A⁻ is an anion, and mixtures of two or more of the above compounds.

The substituent R is preferably R', where R' is $C_{1-4}$alkyl. An especially preferred R is R", where R" is methyl.

The substituents $T_1$ and $T_2$ are preferably $T'_1$ and $T'_2$, where $T'_1$ and $T'_2$ independently of each other, are H, —CN, —CONH$_2$,

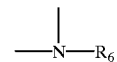

It is especially preferred that $T_1$ and $T_2$ are $T_1"$ and $T_2"$, where $T_1"$ and $T_2"$ independently of each other, are H, —CONH$_2$ or The substituent $R_1$ is preferably $R_1'$, where $R_1'$ is $C_{1-6}$alkylene. It is especially preferred that $R_1$ is $R_1"$, where $R_1"$ is $C_{2-3}$-alkylene, most preferably $C_3$-alkylene. The substituents $R_2$ and $R_3$ independently of each other are preferably $R_2'$ and $R_3'$, where $R_2'$ and $R_3'$ is $C_{1-6}$alkyl, especially preferred are $R_2"$ and $R_3"$ as methyl. The substituent $R_4$ is preferably $R_4'$, where $R_4'$ is $C_{1-6}$alkyl or hydrogen, especially preferred is $R_4"$ as hydrogen or methyl. The substituent $R_5$ is preferably $R_5'$, where $R_5'$ is a $C_{1-6}$alkyl radical. It is especially preferred that $R_5$ is $R_5"$, where $R_5"$ is a $C_{1-2}$-alkyl radical. The substituents $R_6$ and $R_7$ independently of each other are preferably $R_6'$ and $R_7'$, where $R_6'$ and $R_7'$ is hydrogen or a $C_{1-4}$alkyl radical, especially preferred are $R_6"$ and $R_7"$, where $R_6"$ and $R_7"$ is hydrogen or methyl. The substituent $R_8$ is preferably $R_8'$ where $R_8'$ is H or $C_{1-4}$alkyl radical. It is especially preferred that $R_8$ is $R_8"$, where $R_8"$ is hydrogen or methyl.

The substituent $R_{10}$ is preferably $R_{10}'$, where $R_{10}'$ is

The substituent $R_{11}$ is preferably $R_{11}'$ as methyl.

m is preferably 0.

X is preferably $X_2$, $X_6$, $X_{6a}$, $X_7$, $X_8$ or $X_9$, especially preferred are $X_6$ and $X_{6a}$.

Preferred azo compounds are of formula Ia

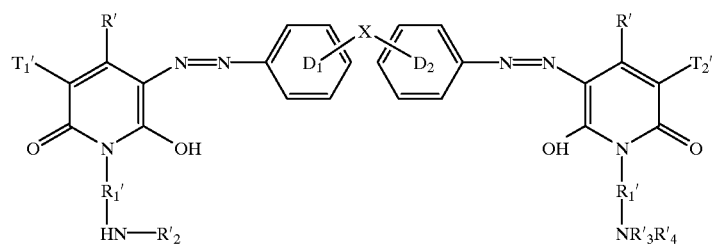

(1a)

wherein R', $T_1'$, $T_2'$, $R_1'$, $R_2'$ and $R_4'$ have the above meanings and X is $X_2$, $X_6$, $X_{6a}$, $X_7$, $X_8$ or $X_9$.

Particularly preferred azo compounds have the above meaning of formula Ia, wherein R' is R", $T_1'$ is $T_1"$, $T_2'$ is $T_2"$, $R_1'$ is $R_1"$, $R_2'$ is $R_2"$ and $R_4'$ is $R_4"$ and X is $X_6$ and $X_{6a}$, and the meanings of $T_1"$, $T_2"$, $R_1"$, $R_2"$, $R_4"$. $X_6$ and $X_{6a}$ are as given above.

Two especially preferred azo compounds of the present invention have the following formulae (1b) and (1c):

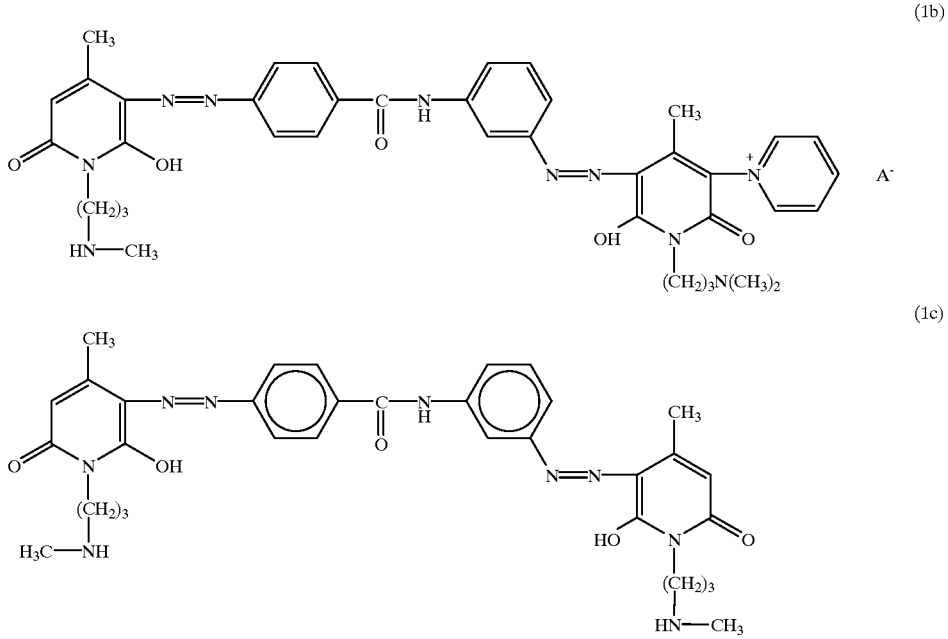

One process for the preparation of the compounds of formula I is characterized in that a diamine of formula II is coupled

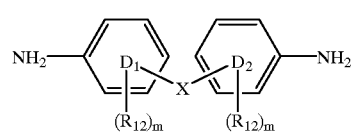

with a coupling component of formulae III and IV

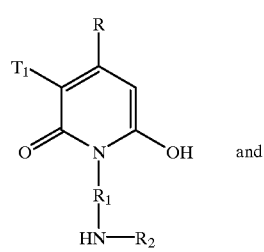

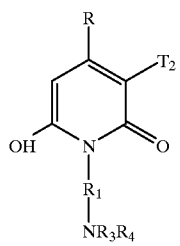

A further process for production of the compounds of formula I is characterized in that 1 mol of a diazo compound of an amino compound of formula V

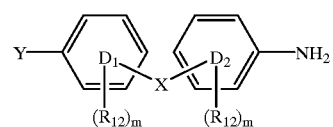

wherein Y is —NO$_2$ or —NH—acyl,
is first coupled with 1 mol of a coupling component of formula III, the nitro group in the thus obtained mono azo compound is reduced or the acyl amino group is saponified, the thus obtained amino azo compound is diazotized and coupled with a coupling component of formula IV, to give an azo compound of formula I. Alternatively, compound V wherein Y is —NO$_2$ or —NH—acyl, is first coupled with 1 mol of a coupling component of formula IV, the nitro group in the thus obtained mono azo compound is reduced or the acyl amino group is saponified, the thus obtained amino azo compound is diazotized and coupled with a coupling component of formula III, to give an azo compound of formula I.

The coupling can be carried out according to known methods, advantageously in an aqueous medium, optionally in the presence of an organic solvent, at temperatures of between —10° C. to room temperature, optionally in the presences of a coupling accelerator like pyridine, urea, etc. The reduction of the nitro group as well as the saponification of the acyl amino group, can be carried out according to known methods; in addition diazotization is carried out according to known methods.

The starting compounds of formula II, III, IV or V are known or can be made according to known methods.

In the compounds of formula I, the anion A may be exchanged for other anions, for example with the help of an ion-exchanger or by replacing with salts or acids, optionally in several steps, for example by the hydroxide or by the bicarbonate or according to the processes described in German DE 2001748 or DE 2001816.

By A⁻ is meant organic and inorganic ions, for example halide, such as chloride or bromide, further sulfate, bisulfate, methylsulfate, aminosulfate, perchlorate, benzosulfonate, oxalate, maleinate, acetate, propionate, lactate, succinate, tartrate, malate, methanesulfonate or benzoates or complex anions, such as chlorine zinc double salts, further anions of the following acids: boric acid, citric acid, glycolic acid, diglycolic acid or adipic acid or addition products of orthoboric acid with polyalcohols, for example cis-polyolene.

The thus obtained compounds can be used as dyes directly or can be used in form of an aqueous, for example concentrated stabile solution, or in the form of their granulate in quaternary form and/or the mentioned salts of mineral acids or organic acids, for coloring fibres of all types, of cellulose, cotton or leather, particularly however paper or paper products.

A particularly efficacious composition of such liquid preparations is for example following (parts are by weight):
  100 parts of a compound of formula I as acid addition salt or as quaternary ammonium salt,
  1–100 parts preferably 1–10 parts of an inorganic salt,
  1–100 parts of an organic acid such as formic acid, acetic acid, lactic acid, citric acid, propionic acid or methoxy acetic acid,
  100–800 parts water,
  0–500 parts of a solvent means (for example glycols such as diethyleneglycol, triethyleneglycol, hexyleneglycol; glycol ethers such as methylcellosolve, methylcarbitole, butylpolyglycol; ammonia, formamide, dimethylformamide).

The compounds of formula I can be processed according to known methods, preferably into granulated dyeing preparations, advantageously by granulation as in French Patent Application FR 1.581.900.

A particularly effective composition for solid preparations is for example the following (parts are by weight):
  100 parts of compound of formula I as acid addition salt or as quaternary ammonium salt,
  1–100 parts preferably 1–10 parts of an inorganic salt,
  0–800 parts of an extender (preferably nonionic such as dextrine, sugar, dextrose or urea).

Up to 10% moisture can be present in the solid preparations.

The dyes can also be used in the production of pulp dyeing of bleached and unbleached paper. They can furthermore be used in dyeing paper according to the dip dyeing process.

The coloring of paper, leather or cellulose is carried out according to known methods, The new dyes or preparations thereof, colour the waste water resulting from paper production to practically no extent. This is important for the treatment of the waste water. They are highly substantive, do not mottle on dyed paper and are generally pH-insensitive. Dyeings on paper demonstrate good light fastness. The nuances change tone in tone after long periods of exposure to light.

The dyed papers are wet fast, especially noteworthy are the excellent alcohol fastness and soapy water fastness. Additionally, the reductive bleachability of the dyed papers is especially good.

In the following examples, parts are parts by weight, the percent is weight percent, the temperature is given in degrees celsius.

EXAMPLE 1

45.4 g 4,3'-diaminobenzanilide (0.2 mol) are tetrazotized according to known methods at 0–5° C. with 27.6 g sodiumnitrite (0.4 mol). 41.2 g (0.2 mol) 6-hydroxy-4-methyl-1-(3'-methylamino)-propyl-pyridone-(2) are added in a continuous manner to the tetraazo solution over a period of 3 hours at a temperature between 5–10° and at a pH value of 1.5. The asymmetric dye of the following formula is obtained:

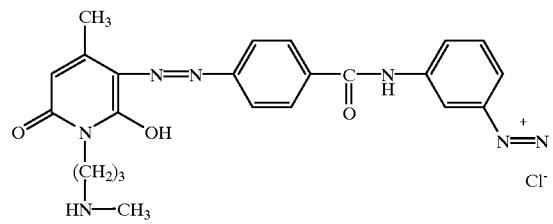

57.4 g (0.2 mol) 6-hydroxy-4-methyl-1-(3'-dimethylamino)-propyl-pyridonyl-(3)-pyridinium-betainebase are added to this yellow dye suspension. A pH-value of 2.4–2.6 is set by adding 75 g sodiumacetate. The dye of the following formula is obtained:

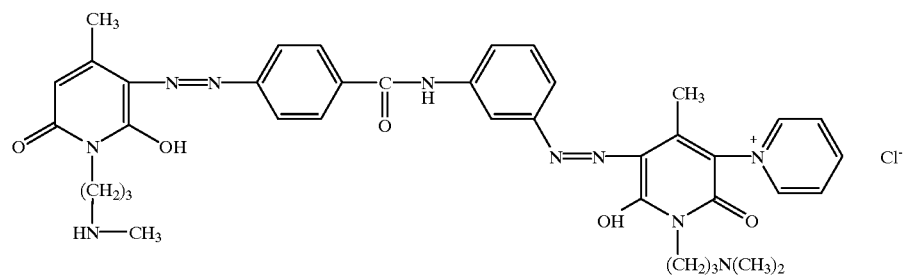

The $\lambda_{max}$-value of this dye is 435 mm. By precipitating with 230 g caustic soda (30%), the dyestuff is converted into the betainebase and is filtered. In acetic acid solution, it colours paper in brilliant yellow tones.

In the same way as described in example 1 above, using the corresponding starting compounds, examples 2 to 69 in the following tables 1 to 4, can be obtained. The compounds have formula (1) as shown below. In the tables "*" signifies the atom which is bonded to $D_1$.

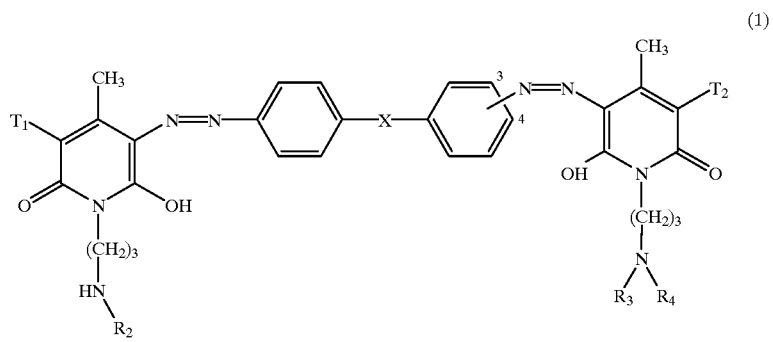

(1)

TABLE 1

| Bsp. Nr. | $T_1$ | $T_2$ | X | $R_2$ | $R_3$ | $R_4$ | Pos. Sub. | λ max. [nm] |
|---|---|---|---|---|---|---|---|---|
| 2 | H | H | —*C(=O)—NH— | —CH₃ | —CH₃ | —CH₃ | 4 | 452 |
| 3 | pyridinium | H | " | " | " | " | 3 | 436 |
| 4 | H | H | " | " | " | " | 3 | 432 |
| 5 | H | H | —C(=O)—NH—CH₂—CH(CH₃)—NH—C(=O)— | " | " | " | 4 | 421 |
| 6 | H | —CN | —*C(=O)—NH— | " | " | " | 3 | 438 |
| 7 | H | —CN | " | " | " | " | 4 | 465 |
| 8 | H | —CN | " | —CH₂CH₃ | " | " | 3 | 438 |
| 9 | H | —CN | " | —CH(CH₃)₂ | " | " | 3 | 438 |
| 10 | H | pyridinium | " | —CH₃ | " | " | 4 | 458 |
| 11 | H | " | " | —CH₂CH₃ | " | " | 4 | 458 |
| 12 | H | " | " | " | " | " | 3 | 435 |
| 13 | H | " | " | —CH(CH₃)₂ | " | " | 3 | 435 |
| 14 | —CN | H | " | —CH₃ | " | " | 3 | 442 |
| 15 | —CN | —CN | " | " | " | " | 3 | 448 |

TABLE 2

| Bsp. Nr. | $T_1$ | $T_2$ | X | $R_1$ | $R_2$ | $R_3$ | Pos. Sub. | λ max. [nm] |
|---|---|---|---|---|---|---|---|---|
| 16 | —CN | —CN | —*C(=O)—NH— | CH(CH₃)₂ | —CH₃ | CH₃ | 3 | 448 |

TABLE 2-continued

| Bsp. Nr. | T$_1$ | T$_2$ | X | R$_1$ | R$_2$ | R$_3$ | Pos. Sub. | λ max. [nm] |
|---|---|---|---|---|---|---|---|---|
| 17 | —CN | 3-methyl-pyridinium (N⁺, CH$_3$) | " | —CH$_3$ | " | " | 3 | 444 |
| 18 | —CN | pyridinium (N⁺) | " | " | —CH$_3$ | " | 3 | 444 |
| 19 | —CN | " | " | " | " | " | 4 | 468 |
| 20 | —CN | " | " | " | " | " | 4 | 467 |
| 21 | pyridinium (N⁺) | —CN | " | " | " | " | 3 | 444 |
| 22 | —CN | H | " | " | " | " | 4 | 461 |
| 23 | —CN | —CN | " | " | " | " | 4 | 473 |
| 24 | —CONH$_2$ | —CONH$_2$ | " | " | " | " | 3 | 440 |
| 25 | " | H | " | " | " | " | 3 | 432 |
| 26 | " | H | " | " | " | H | 3 | 432 |
| 27 | " | H | " | " | " | H | 4 | 451 |
| 28 | " | H | " | —CH$_2$CH$_3$ | " | —CH$_3$ | 4 | 451 |
| 29 | H | —CONH$_2$ | " | —CH$_3$ | " | " | 4 | 451 |
| 30 | —CONH$_2$ | —CN | " | " | " | " | 3 | 445 |

TABLE 3

| Ex No | T$_1$ | T$_2$ | X | R$_1$ | R$_2$ | R$_3$ | Pos Sub | λ max. [nm] |
|---|---|---|---|---|---|---|---|---|
| 31 | —CONH$_2$ | pyridinium (N⁺) | *—C(=O)—NH— | —CH$_3$ | —CH$_3$ | CH$_3$ | 3 | 448 |
| 32 | pyridinium (N⁺) | —CONH$_2$ | " | " | " | H | 3 | 451 |
| 33 | H | " | " | " | " | H | 3 | 433 |
| 34 | H | H | " | " | " | H | 3 | 432 |
| 35 | H | H | " | " | " | H | 4 | 458 |
| 36 | —CONH$_2$ | —CONH$_2$ | " | " | " | H | 4 | 454 |
| 37 | " | " | " | —CH$_2$CH$_3$ | —CH$_2$CH$_3$ | H | 4 | 454 |
| 38 | " | " | " | —CH(CH$_3$)$_2$ | —CH(CH$_3$)$_2$ | H | 4 | 454 |
| 39 | H | H | " | —CH$_2$CH$_3$ | —CH$_2$CH$_3$ | H | 3 | 432 |
| 40 | —CONH$_2$ | —CONH$_2$ | " | —CH$_3$ | —CH$_3$ | H | 3 | 435 |
| 41 | H | H | " | —CH(CH$_3$)$_2$ | —CH(CH$_3$)$_2$ | H | 3 | 432 |
| 42 | —CONH$_2$ | —CONH$_2$ | " | —CH$_2$CH$_3$ | —CH$_2$CH$_3$ | H | 3 | 435 |
| 43 | H | H | " | CH$_2$(CH$_2$)$_4$CH$_3$ | CH$_2$(CH$_2$)$_4$CH$_3$ | H | 3 | 432 |
| 44 | —CN | —CN | " | —CH$_3$ | —CH$_3$ | H | 3 | 448 |
| 45 | —CN | —CN | " | " | " | H | 4 | 469 |
| 46 | —CONH$_2$ | H | " | " | —CH$_2$CH$_3$ | H | 3 | 432 |
| 47 | H | —CN | " | —CH$_2$CH$_3$ | —CH$_3$ | H | 3 | 436 |
| 48 | H | —CN | " | " | " | H | 4 | 455 |
| 49 | H | H | —C(=O)—NH—CH$_2$—CH(CH$_3$)—NH—C(=O)— | —CH$_3$ | " | H | 4 | 446 |
| 50 | —CONH$_2$ | —CONH$_2$ | " | " | " | H | 4 | 451 |

TABLE 4

| Ex. No. | T₁ | T₂ | X | R₁ | R₂ | R₃ | Pos Sub | λ max nm |
|---|---|---|---|---|---|---|---|---|
| 51 | H | pyridinium | —NH—C(=O)—* | —CH₃ | —CH₃ | —CH₃ | 3 | 434 |
| 52 | H | H | " | " | " | " | 3 | 430 |
| 53 | H | H | " | " | " | " | 4 | 452 |
| 54 | H | —CN | " | " | " | " | 3 | 438 |
| 55 | H | —CN | " | " | " | " | 4 | 464 |
| 56 | H | —CN | " | —CH₂CH₃ | " | " | 3 | 438 |
| 57 | H | —CN | " | " | " | " | 4 | 464 |
| 58 | —CN | H | " | —CH₃ | " | " | 3 | 440 |
| 59 | —CN | pyridinium | " | " | " | " | 3 | 445 |
| 60 | pyridinium | —CN | " | " | " | " | 3 | 444 |
| 61 | " | H | " | " | " | " | 4 | 458 |
| 62 | —CONH₂ | H | " | " | " | " | 3 | 432 |
| 63 | " | H | " | " | " | " | 4 | 451 |
| 64 | H | —CONH₂ | " | " | " | " | 4 | 453 |
| 65 | —CONH₂ | —CN | " | " | " | " | 3 | 444 |
| 66 | H | —CONH₂ | " | " | " | " | 3 | 439 |
| 67 | pyridinium | " | " | " | " | " | 3 | 447 |
| 68 | " | " | " | " | " | H | 3 | 450 |
| 69 | " | " | " | " | " | " | 4 | 471 |

EXAMPLE 70

45.4 g 4,3'-diaminobenzanilide (0.2 mol) are tetrazotized according to known methods in a hydrochloric acid medium, at 0–5° C. with 27.6 g sodium nitrite (0.4 mol). 49.0 g (0.25 mol) 6-hydroxy-4-methyl-1-(3'-methylamino)-propyl-pyridone-(2) are added continuously to the tetraazo solution over a period of 3 hours at a temperature between 5–10° C. and at a pH value of 1.5. A yellow dye suspension is formed.

After coupling is completed, 43.3 g (0.15 mol) 6-hydroxy-4-methyl-1-(3'-dimethylamino)-propyl-pyridonyl-(3)-pyridinium-betainebase is added to this yellow dye suspension. A pH-value of 2.4–2.6 is set by addition of 75 g sodiumacetate. By precipitating using 230 g caustic soda (30%) the dye is converted into the betainebase and is thereafter filtered. The dye comprising the compounds of the following formula is obtained:

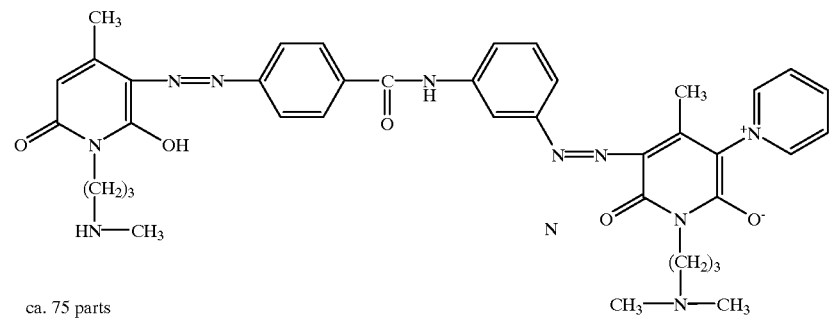

ca. 75 parts and

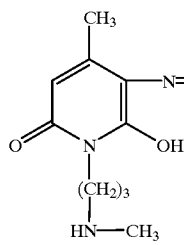  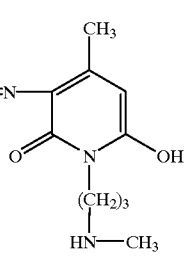

ca. 25 parts

The $\lambda_{max}$-value of this dye is 435 mm. In acetic acid, it dyes paper in brilliant yellow shades.

Application Example A 70 parts chemically bleached sulphite cellulose obtained from pinewood and 30 parts chemically bleached cellulose obtained from birchwood are beaten in 2000 parts water in a Hollander. 0.2 parts of the dye of example 70 are sprinkled into this pulp. After mixing for 10 mins, paper is produced from this pulp. The absorbent paper obtained in this way is dyed a brilliant yellow. The waste water is colorless.

Application Example B 0.2 parts of the dye of Example 70, were dissolved in 100 parts hot water and cooled to room temperature. The solution is added to 100 parts chemically bleached sulphite cellulose which have been ground with 2000 parts water in a Hollander. After 15 minutes thorough mixing resin size and aluminium sulfate are added thereto. Paper produced in this way has a brilliant yellow nuance and exhibits perfect light and wet fastness.

Application Example C

An absorbent length of unsized paper is drawn at 40–50° through a dyestuff solution having the following composition:

0.3 parts of the dye of Example 70

0.5 parts of starch and 99.0 parts of water.

The excess dyestuff solution is squeezed out through two rollers. The dried length of paper is dyed a brilliant yellow.

The dyestuffs of Examples 1 to 69 may also be used for dyeing by a method analogous to that of Application Examples A to C. The paper dyeings obtained show good fastness properties.

Application Example D 100 parts freshly tanned and neutralised chrome leather are agitated for 30 minutes in a vessel with a liquor consisting of 250 parts of water at 55° and 0.5 parts of the dye of Example 70 in acid addition salt form, and then treated in the same bath for 30 minutes with 2 parts of an anionic fatty licker based on sulphonated train oil. The leather is then dried and prepared in the normal way, giving a leather evenly dyed in a brilliant yellow shade.

By a method analogous to that described in Application Example D the dyes according to Examples 1–69 may be used for dyeing leather.

Further vegetable-tanned leathers of low affinity may be dyed using the dyes as described herein, in accordance with known methods.

Application Example E

Water is added to a dry pulp in hollander consisting of 60% (by weight) of mechanical wood pulp and 40% (by weight) of unbleached sulphite cellulose, and the slurry is beaten in order to obtain a dry content slightly exceeding 2.5% and having a beating degree of 40° SR (degrees Schopper-Riegler). The slurry is then exactly adjusted to a high density dry content of 2.5% by adding water.

5 Parts of a 2.5% aqueous solution of the dyestuff according to Example 70, are added to 200 parts of the above resulting slurry. The mixture is stirred for about 5 minutes and, after the addition of 2% (by weight) resin size and then 4% (by weight) alum (based on the dry weight) is further stirred for a few minutes until homogeneous. The resulting pulp is diluted with about 500 parts water to a volume of 700 parts and then used for the production of paper sheets by suction on a sheet former. The resulting paper sheets are dyed a brilliant yellow.

By a method analogous to that described in Application Example E any one of the dyes of Examples 1–69 may be used instead of that of Example 70. In all cases, the waste paper exhibits a substantially low residual dye concentration.

Application Example F

Water is added to a dry pulp in a hollander consisting of 50% (by weight) of chemically bleached sulphite cellulose obtained from pinewood and 50% (by weight) of chemically bleached sulphite cellulose obtained from birchwood, and the slurry is ground until a degree of grinding of 35° SR is reached. The slurry is then adjusted to a high density dry content of 2.5% by adding water, and the pH of this suspension is adjusted to 7.

10 Parts of a 0.5% aqueous solution of the dye mixture adjusted according to Example 70 are added to 200 parts of the above resulting slurry, and the mixture is stirred for 5 minutes. The resulting pulp is diluted with 500 parts water and then used for the production of sheets by suction on a sheet former. The paper sheets thus obtained have a brilliant yellow shade.

By a method analogous to that described in Application Example F further dye mixtures may be used consisting of any one of the dyestuffs of Examples 1–69. In all cases, paper sheets are formed having a brilliant yellow shade.

What is claimed is:

1. A basic azo compound of formula I

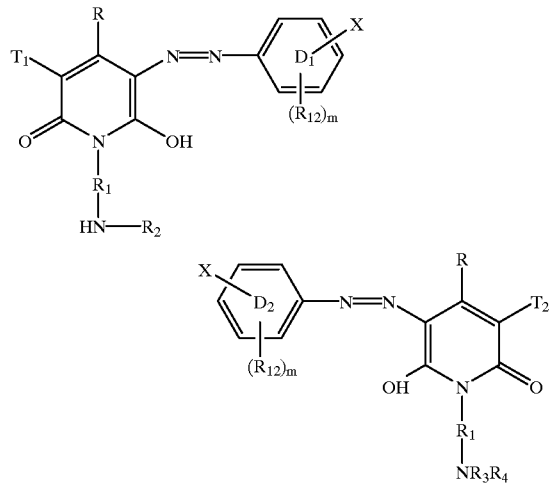

(I)

wherein the two Rs independently of each other are H, $C_{1-4}$alkyl, $C_{5-6}$cycloalkyl, phenyl, benzyl or phenylethyl, $T_1$ and $T_2$ independently of each other are H, —CN, —COOR$_5$, CONR$_6$R$_7$, SO$_2$NR$_6$R$_7$,

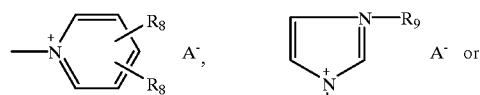

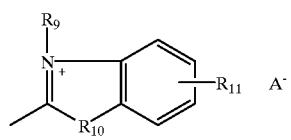

$R_1$ signifies $C_{1-6}$alkylene or $C_{2-6}$alkenylene, $R_2$ and $R_3$ independently of each other are unsubstituted $C_{1-6}$alkyl, $C_{2-6}$alkyl substituted by OH, CN or halogen, phenyl-$C_{1-3}$alkyl, wherein the phenyl radical is optionally substituted from 1 to 3 times, by chlorine, $C_{1-4}$alkyl or $C_{1-4}$alkoxy, unsubstituted $C_{5-6}$cycloalkyl or $C_{5-6}$cycloalkyl substituted from 1 to 3 times by $C_{1-4}$alkyl groups, $R_4$ signifies any of the meanings of $R_2$ or $R_3$ or hydrogen, $R_5$ signifies a $C_{1-6}$alkyl radical or phenyl-$C_{1-3}$alkyl radical, $R_6$ and $R_7$ independently of each other are H or a $C_{1-4}$alkyl radical, $R_8$ independently of each other signifies H, a $C_{1-4}$alkyl radical, —NR$_6$R$_7$ or —CONR$_6$R$_7$, $R_9$ signifies a $C_{1-4}$alkyl radical or a hydroxy-$C_{1-4}$alkyl radical, $R_{10}$ signifies —S—, —O— or

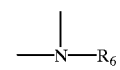

$R_{11}$ signifies hydrogen or a $C_{1-4}$alkyl radical, the two $R_{12}$'s independently of each other, are halogen, OH, a $C_{1-4}$alkyl radical or a $C_{1-4}$alkoxy radical, the two m's independently of each other, are 0, 1 or 2, X signifies:

$X_1$ a direct bond;

$X_2$ a straight or branched $C_{1-4}$alkylene;

$X_3$ —NH—CS—NH—; $X_4$ —O—; $X_5$ —CH=CH—; $X_6$ —*NH—CO—; $X_{6a}$ —NH—*CO—; $X_7$

wherein the asterixed atom is bonded to ring $D_1$;

$X_8$

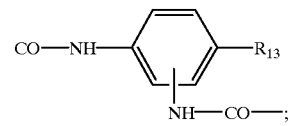

$X_9$

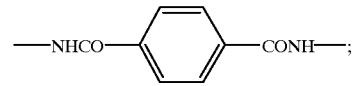

$X_{10}$

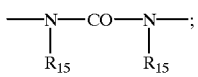

$X_{11}$

$X_{12}$

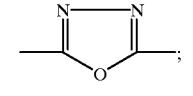

$X_{13}$

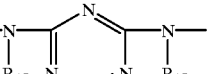

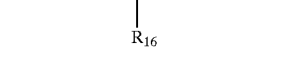

$X_{14}$

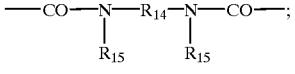

$R_{13}$ is halogen, a $C_{1-4}$alkyl radical or a $C_{1-4}$alkoxy radical, $R_{14}$ is straight or branched $C_{1-4}$-alkylene, the two $R_{15}$S independently of each other, are H or a $C_{1-4}$alkyl radical, $R_{16}$ is halogen, —NHCH$_2$CH$_2$OH, —N(CH$_2$CH$_2$OH)$_2$, NH$_2$, OH or —NH(CH$_2$)$_{2-3}$N(C$_2$H$_5$)$_2$, A⁻ is an anion, or mixtures of two or more of the above compounds.

2. A compound of claim 1 having the formula Ia

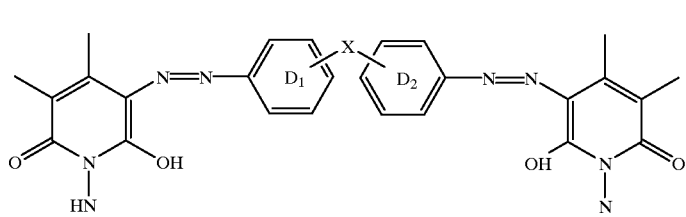

wherein

X is $X_2$, $X_6$, $X_{6a}$, $X_7$, $X_8$ or $X_9$.

3. A compound of claim 2, wherein

R, $R_2$, and $R_3$ is each methyl, $T_1$, and $T'_2$, signify $T''_1$ and $T''_2$ which independently of each other, are H, —CONH$_2$ or

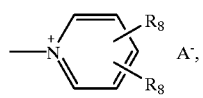

$R_1$ is $C_{2-3}$-alkylene, $R_8$ hydrogen or methyl, and

X is $X_6$ and $X_{6a}$.

4. A compound of claim 1 having the following formula (1b):

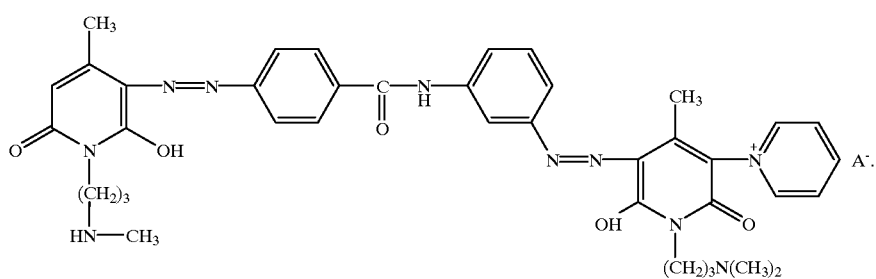

5. A compound of claim 1, having the following formula (1c):

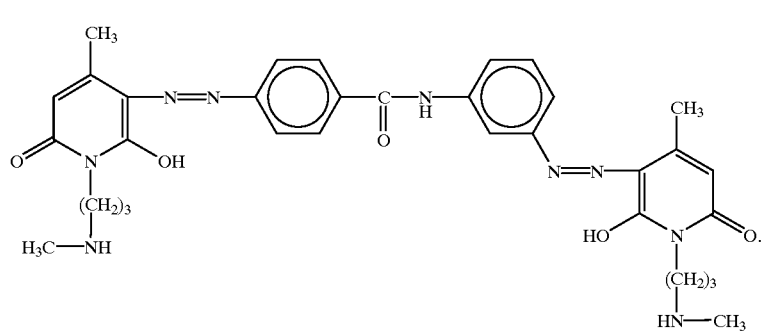

6. A mixture comprising a compound of formula (1b) as claimed in claim 4 and (1c) as claimed in claim 5.

7. A process for the preparation of the compounds of formula I wherein a diamine of formula II is coupled

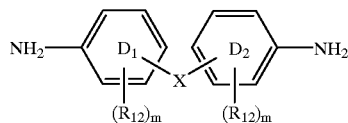
(II)

with a coupling component of formulae III and IV

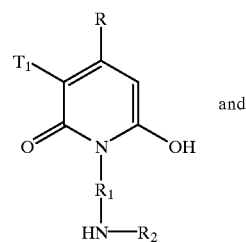
(III)

and

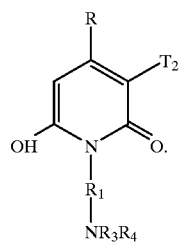
(IV)

8. A process for the production of a mixture of the compounds of formula I wherein two or more compounds obtained according to the process of claim 7 are mixed together.

9. A process for the production of the compounds of formula I wherein 1 mol of a diazo compound of an amino compound of formula V

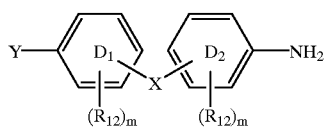
(V)

wherein Y is $-NO_2$ or $-NH$-acyl, is first coupled with 1 mol of a coupling component of formula III, the nitro group in the thus obtained mono azo compound being reduced or the acyl amino group being saponified, the thus obtained amino azo compound being diazotized and coupled with a coupling component of formula IV, as defined in claim 7, to give an azo compound of formula I.

10. A process as claimed in claim 9 wherein the order of coupling coupling components III and IV is reversed.

11. A method of coloring or printing on a substrate which is paper, a paper product, or leather which comprises applying to said substrate a compound of claim 1, 2, 3, 4, or 5, mixtures of two or more of said compounds, or a mixture of claim 6.

12. Leather, paper or paper products which have been dyed or printed with one or more compounds of claim 1.

* * * * *